United States Patent
Jeong et al.

(10) Patent No.: US 10,059,199 B2
(45) Date of Patent: Aug. 28, 2018

(54) DRIVING APPARATUS FOR REAR WHEEL OF ENVIRONMENT-FRIENDLY VEHICLE

(71) Applicant: HYUNDAI DYMOS INCORPORATED, Chungcheongnam-Do (KR)

(72) Inventors: Hee Cheon Jeong, Incheon (KR); Geun Ho Kim, Seoul (KR); Sang Ki Lee, Gyeonggi-Do (KR)

(73) Assignee: Hyundai Dymos Incorporated (KR)

( * ) Notice: Subject to any disclaimer, the term of this patent is extended or adjusted under 35 U.S.C. 154(b) by 0 days.

(21) Appl. No.: 15/375,903

(22) Filed: Dec. 12, 2016

(65) Prior Publication Data

US 2017/0182884 A1   Jun. 29, 2017

(30) Foreign Application Priority Data

Dec. 24, 2015 (KR) .......................... 10-2015-0185660

(51) Int. Cl.

| B60K 17/16 | (2006.01) |
|---|---|
| B60L 15/20 | (2006.01) |
| B60K 1/02 | (2006.01) |
| B60K 6/48 | (2007.10) |
| B60K 6/52 | (2007.10) |
| B60K 7/00 | (2006.01) |
| B60K 17/04 | (2006.01) |
| F16H 3/72 | (2006.01) |
| B60K 17/356 | (2006.01) |

(52) U.S. Cl.
CPC .............. B60K 17/165 (2013.01); B60K 1/02 (2013.01); B60K 6/48 (2013.01); B60K 6/52 (2013.01); B60K 7/0007 (2013.01); B60K 17/046 (2013.01); B60L 15/2036 (2013.01); B60L 15/2054 (2013.01); F16H 3/72 (2013.01); B60K 17/356 (2013.01); B60K 2007/0092 (2013.01); B60K 2741/286 (2013.01); B60L 2240/42 (2013.01); B60L 2240/486 (2013.01); B60Y 2200/92 (2013.01); B60Y 2300/60 (2013.01); B60Y 2300/70 (2013.01); B60Y 2400/73 (2013.01); Y02T 10/7258 (2013.01); Y10S 903/916 (2013.01); Y10S 903/93 (2013.01)

(58) Field of Classification Search
CPC ........ B60K 17/165; B60K 23/02; B60K 6/52; B60L 15/2054; B60L 15/2036
See application file for complete search history.

(56) References Cited

U.S. PATENT DOCUMENTS

| 5,258,912 A * | 11/1993 | Ghoneim ............ B60L 15/2036 180/6.2 |
| 5,396,968 A * | 3/1995 | Hasebe .................... B60K 1/02 180/233 |

(Continued)

FOREIGN PATENT DOCUMENTS

| JP | 05-169991 A | 7/1993 |
| JP | 2014-200145 A | 10/2014 |
| KR | 20130005407 A | 1/2013 |

Primary Examiner — Frank B Vanaman
(74) Attorney, Agent, or Firm — Tarolli, Sundheim, Covell & Tummino LLP

(57) ABSTRACT

A rear-wheel drive apparatus of an eco-friendly vehicle is capable of improving the longitudinal driving force and handling performance of a vehicle by independently driving both rear wheels of the vehicle using a plurality of drive motors.

3 Claims, 4 Drawing Sheets

(56) References Cited

U.S. PATENT DOCUMENTS

| | | | |
|---|---|---|---|
| 6,295,487 B1* | 9/2001 | Ono | B60K 6/44 180/165 |
| 2007/0158119 A1* | 7/2007 | Pascoe | B60K 6/48 180/243 |
| 2008/0001558 A1* | 1/2008 | Kikuchi | B60K 6/52 318/5 |
| 2012/0118652 A1* | 5/2012 | Yamamoto | B60K 6/52 180/65.6 |
| 2013/0261863 A1* | 10/2013 | Noguchi | B60K 1/02 701/22 |
| 2015/0066278 A1* | 3/2015 | Katayama | B62B 5/0069 701/22 |

* cited by examiner

DRIVING APPARATUS FOR REAR WHEEL OF ENVIRONMENT-FRIENDLY VEHICLE

RELATED APPLICATIONS

The present invention claims priority from KR 10-2015-0185660, filed 24 Dec. 2015, the entirety of which is incorporated herein by reference.

BACKGROUND OF THE INVENTION

Field of the Invention

Exemplary embodiments of the present invention relate to a rear-wheel drive apparatus of an eco-friendly vehicle, and more particularly, to a rear-wheel drive apparatus of an eco-friendly vehicle, which is capable of improving the longitudinal driving force and handling performance of a vehicle by independently driving both rear wheels of the vehicle using a plurality of drive motors.

Description of the Related Art

In order to change a conventional front-wheel-drive eco-friendly vehicle, such as an HEV (Hybrid Electric Vehicle), a PHEV (Plug-in Hybrid Electric Vehicle), an EV (Electric Vehicle), or a hydrogen fuel cell vehicle, into a four-wheel drive vehicle, a drive device configured by a motor and a reducer is typically mounted to the rear axle of the front-wheel drive vehicle, thereby improving the driving force of the four-wheel drive vehicle and securing the stability of the vehicle on the road such as the snowy road.

A conventional rear-wheel drive device typically includes a drive motor driven at high voltage, a reducer for obtaining the final reduction gear ratio of a vehicle, and a clutch or a brake serving as a wet-type multi-disk friction material in order to remove the unnecessary torque resistance of the motor.

Korean Patent Laid-open Publication No. 10-2013-0005407 discloses a technique for driving four wheels of an eco-friendly vehicle using a single drive motor for driving rear wheels, a planetary gear train for decelerating the single drive motor, and a differential gear connected to the output shaft of the planetary gear train.

However, the configuration disclosed in the above Document may improve only the longitudinal driving forces of front and rear wheels as in a typical four-wheel drive vehicle.

Hence, the method of driving the rear wheels using the single drive motor may not control the handling performance of the vehicle in situations where it is necessary to separately control the driving forces of both rear wheels, for example it is necessary to rapidly change lanes while the vehicle is traveling.

RELATED ART DOCUMENT

Patent Document (Patent Document 1) Korean Patent Laid-open Publication No. 10-2013-0005407

SUMMARY OF THE INVENTION

Accordingly, the present invention has been made in view of the above-mentioned problem, and an object thereof is to provide a rear-wheel drive apparatus of an eco-friendly vehicle, which is capable of improving the longitudinal driving force and handling performance of a vehicle using a plurality of drive motors for independently driving both rear wheels of the vehicle.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, a rear-wheel drive apparatus of an eco-friendly vehicle for independently driving first and second rear wheels of a vehicle includes a rear-wheel drive device including a first motor for driving the first rear wheel and a second motor for driving the second rear wheel, a rear-wheel reduction device reducing driving forces of the first and second motors to respectively transfer the driving forces to the first and second rear wheels, and a controller for controlling the rear-wheel drive device and the rear-wheel reduction device so as to independently drive the first and second motors.

The rear-wheel reduction device may include a first planetary gear set disposed between an output shaft of the first motor and the first rear wheel, and a second planetary gear set disposed between an output shaft of the second motor and the second rear wheel.

The first planetary gear set may include a first carrier connected to the output shaft of the first motor, a first sun gear connected to the first rear wheel, and a first ring gear detachably fixed to a vehicle body, and the second planetary gear set may include a second carrier connected to the output shaft of the second motor, a second sun gear connected to the second rear wheel, and a second ring gear detachably fixed to the vehicle body.

The rear-wheel reduction device may further include a first brake for detachably fixing the first ring gear to the vehicle body while being hydraulically operated, and a second brake for detachably fixing the second ring gear to the vehicle body while being hydraulically operated, and when a hydraulic pressure is not supplied to the first and second brakes, the first and second ring gears may be fixed by the first and second brakes.

The rear-wheel reduction device may further include a clutch for detachably interconnecting the first and second ring gears while being hydraulically operated, and when a hydraulic pressure is not supplied to the clutch, the clutch may be in a lock-off state so that the first and second ring gears are disconnected from each other.

The controller may include a motor control unit operated to independently supply driving power to the first and second motors, a hydraulic control device operated to generate a hydraulic pressure and supply the hydraulic pressure to the first and second brakes and the clutch, and a vehicle control unit electrically connected to the motor control unit and the hydraulic control device so as to control operation of the motor control unit and the hydraulic control device.

When electric power is supplied to at least one of the first and second motors by the motor control unit, the vehicle control unit may control the first and second brakes and the clutch such that the hydraulic pressure is not supplied thereto through the hydraulic control device.

When electric power supplied to the first and second motors is interrupted by the motor control unit, the vehicle control unit may change the first and second brakes from a lock-on state to a lock-off state and change the clutch from a lock-off state to a lock-on state through the hydraulic control device.

The rear-wheel drive apparatus may further include a battery for storing electric power supplied to the first and second motors, and when electric power is supplied to at least one of the first and second motors, the motor control unit may recover electric power generated by the other motor, which is not supplied with electric power, so as to allow the generated electric power to be stored in the battery.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
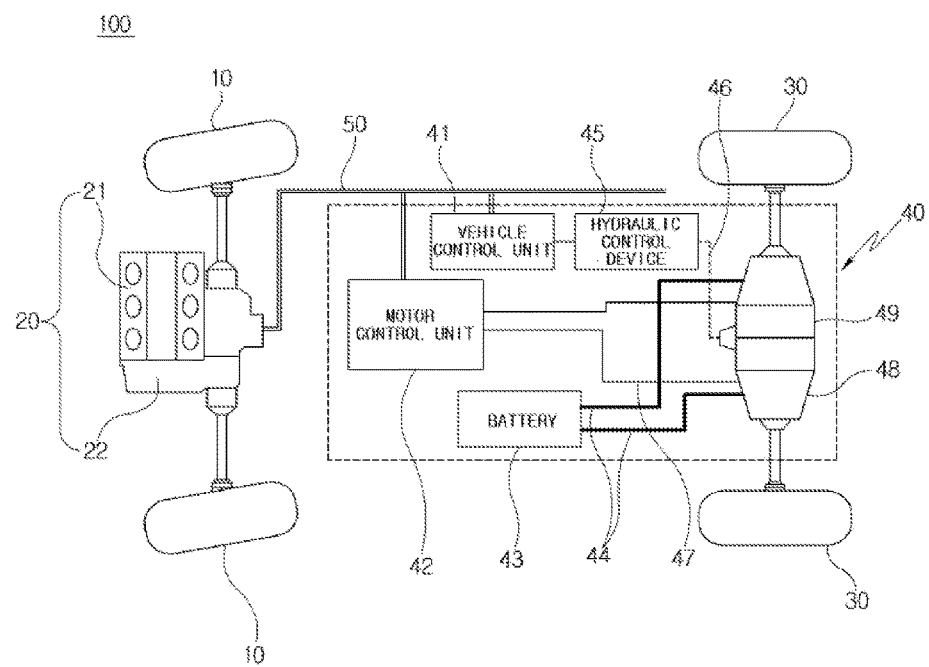
FIG. 1 is a diagram for explaining the configuration of an eco-friendly vehicle including a rear-wheel drive apparatus according to an embodiment of the present invention.

A rear-wheel drive apparatus of an eco-friendly vehicle according to exemplary embodiments of the present invention will be described below in more detail with reference to the accompanying drawings.

The present invention may be embodied in different forms and should not be construed as limited to the embodiments set forth herein. The specific exemplary embodiments of the present invention will be described herein in detail with reference to the accompanying drawings of the exemplary embodiments of the present invention. However, the present invention will not be limited only to the specific exemplary embodiments of the present invention which are disclosed herein. Therefore, it should be understood that the scope and spirit of the present invention can be extended to all variations, equivalents, and replacements in addition to the accompanying drawings of the present invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

As used here, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms are intended to include the plural forms as well, unless the context clearly indicates otherwise.

It will be further understood that the terms "comprises/comprising" or "includes/including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

In addition, the following embodiments are provided so that this disclosure will be thorough and complete, and will fully convey the scope of the present invention to those skilled in the art. In the drawings, the shape, size, or the like of each component may be exaggerated for convenience of description and clarity.

FIG. 1 is a diagram for explaining the configuration of an eco-friendly vehicle 100 including a rear-wheel drive apparatus 40 according to an embodiment of the present invention.

As illustrated in FIG. 1, the vehicle according to the embodiment of the present invention includes a front-wheel drive apparatus 20 for driving front wheels 10, and a rear-wheel drive apparatus 40 for driving rear wheels 30.

The front-wheel drive apparatus 20 is aimed at driving only the front wheels 10, and the power of the front-wheel drive apparatus 20 is not transferred to the rear wheels 30.

The front-wheel drive apparatus 20 may be a typical internal combustion engine or an electric motor according to the type or driving method of a vehicle. The front-wheel drive apparatus 20 includes a front-wheel drive device 21 having the engine or the motor, and a transmission device 22 which reduces the power of the front-wheel drive apparatus 20 and transfers the reduced power to the front wheels 10.

The operation of the front-wheel drive device 21 and the transmission device 22 of the front-wheel drive apparatus 20 is controlled by a vehicle control unit 41 which will be described later.

Meanwhile, the rear-wheel drive apparatus 40 is aimed at driving only the rear wheels 30, and the power of the rear-wheel drive apparatus 40 is not transferred to the front-wheel drive apparatus 20.

Furthermore, the rear-wheel drive apparatus 40 according to the embodiment of the present invention includes a rear-wheel drive device 48 which independently drives the rear wheels 30, and a rear-wheel reduction device 49 which reduces the driving force of the rear-wheel drive device 48 and transfers the reduced force to the rear wheels 30.

To this end, the rear-wheel drive device 48 includes a first motor 481 which drives a first rear wheel 31, and a second motor 482 which drives a second rear wheel 32. The rear-wheel reduction device 49 includes a means for independently reducing the driving force of the first motor 481 and the driving force of the second motor 482.

The configuration of the rear-wheel drive device 48 and the rear-wheel reduction device 49 will be described in detail with reference to FIG. 2.

As illustrated in the drawings, the eco-friendly vehicle 100 according to the embodiment of the present invention includes a controller which controls the rear-wheel drive device 48 and the rear-wheel reduction device 49 in order to independently drive or regenerate the first and second motors 481 and 482 of the rear-wheel drive device 48.

In more detail, as illustrated in the drawings, the controller includes a motor control unit 42 for independently supplying driving power to the first and second motors 481 and 482, a hydraulic control device 45 for generating hydraulic pressure and supplying the hydraulic pressure to the rear-wheel reduction device 49, and a vehicle control unit 41 which is electrically connected to the motor control unit 42 and the hydraulic control device 45 so as to control the operation of the motor control unit 42 and the hydraulic control device 45.

The motor control unit 42 simultaneously or selectively supplies high-voltage power stored in a battery 43 to the first and second motors 481 and 482 through a high-voltage line 44 in response to the control signal of the vehicle control unit 41, or recovers energy from the first and second motors 481 and 482 in order to independently drive or regenerate the first and second motors 481 and 482.

As illustrated in the drawings, the motor control unit 42 is electrically connected to the first and second motors 481 and 482 through a motor control line 47, and is electrically connected to the vehicle control unit 41 through a communication line 50.

In connection with the motor control unit 42, the means known in the related art is applicable to the present invention as long as the motor control unit 42 may supply selectively power to the first and second motors 481 and 482. A detailed description of the motor control unit 42 will be omitted.

The hydraulic control device 45 selectively supplies hydraulic pressure to the respective components of the rear-wheel reduction device 49, more particularly a first brake B1, a second brake B2, and a clutch C, which are operated by hydraulic pressure, in response to the control signal of the vehicle control unit 41 in order to control the rear-wheel reduction device 49.

The hydraulic control device 45 is electrically connected to the vehicle control unit 41 through the communication line 50, and is connected to the first brake B1, the second brake B2, and the clutch C of the rear-wheel reduction device 49 through a hydraulic line 46.

The configuration of the hydraulic control device 45 will be described in detail with reference to FIG. 3.

The vehicle control unit 41 controls the operation of the front-wheel drive device 21 and the operation of the rear-wheel drive device 48 and the rear-wheel reduction device 49.

Although the vehicle control unit 41 performs functions similar to a typical engine control unit (ECU), the vehicle control unit 41 corresponds to the super ordinate concept of the engine control unit since it comprehensively controls the operation of the front-wheel drive device 21 and the operation of the rear-wheel drive device 48.

The vehicle control unit 41 is electrically connected to various sensors, which are installed in the vehicle, through the communication line 50 so as to receive a driver's intention input through a shift lever, an accelerator, and a steering wheel, and the information of the vehicle from the sensors, and controls the operation of the front-wheel drive device 21 and the rear-wheel drive device 48 and the distribution of driving force in consideration of the fuel efficiency, efficiency, and attitude stability of the vehicle, based on the received information.

In more detail, the vehicle control unit 41 according to the embodiment of the present invention controls the front-wheel drive device 21 and the rear-wheel drive device 48 so as to drive the rear wheels 30 using the rear-wheel drive device 48 in the general traveling conditions, e.g. when the vehicle is started or travels at low speed, in consideration of the efficiency of the vehicle, similar to typical EV or HEV vehicles.

The vehicle control unit 41 controls the front-wheel drive device 21 and the rear-wheel drive device 48 so as to drive the front wheels 10 using the front-wheel drive device 21 in the condition that the speed of the vehicle exceeds a predetermined speed, i.e. when the vehicle travels at high speed, in consideration of the efficiency of the vehicle.

However, when there is a need for the handling performance and attitude stability of the vehicle, such as the rapid direction change or lane change of the vehicle, even though the vehicle travels at high speed, the vehicle control unit 41 according to the embodiment of the present invention controls the rear-wheel drive device 48 in order to arbitrarily transfer driving force to the rear wheels 30 which are not driven at present.

In more detail, when the vehicle changes directions and lanes, the vehicle control unit 41 calculates the rotational moment of the vehicle for optimally controlling the first and second motors 481 and 482 for the rear wheels 30, based on information about the speed of the front and rear wheels 10 and 30, the opening degree of the accelerator by the driver, whether or not the brake is operated, a steering angle input by the driver, the state of charge and discharge of the battery 43, the rotation speed of the first and second motors 481 and 482 of the rear-wheel drive device 48, and the yaw rate of the vehicle, calculates the output of the first and second motors 481 and 482 for generating the calculated rotational moment, and transmits a control signal for independently driving the rear wheels 30 depending on the calculated output using the first and second motors 481 and 482 to the motor control unit 42 through the communication line 50. The motor control unit 42 allows the first and second motors 481 and 482 for the rear wheels 30 to be operated.

Through such a process, the rear wheels 30 are independently driven by the first and second motors 481 and 482 for the rear wheels 30 when the vehicle changes directions and lanes. Therefore, it is possible to significantly improve the attitude stability and handling performance of the vehicle, compared to conventional techniques.

The independent driving control of the rear wheels 30 will be described in detail later with reference to FIG. 4.

Figure 2:
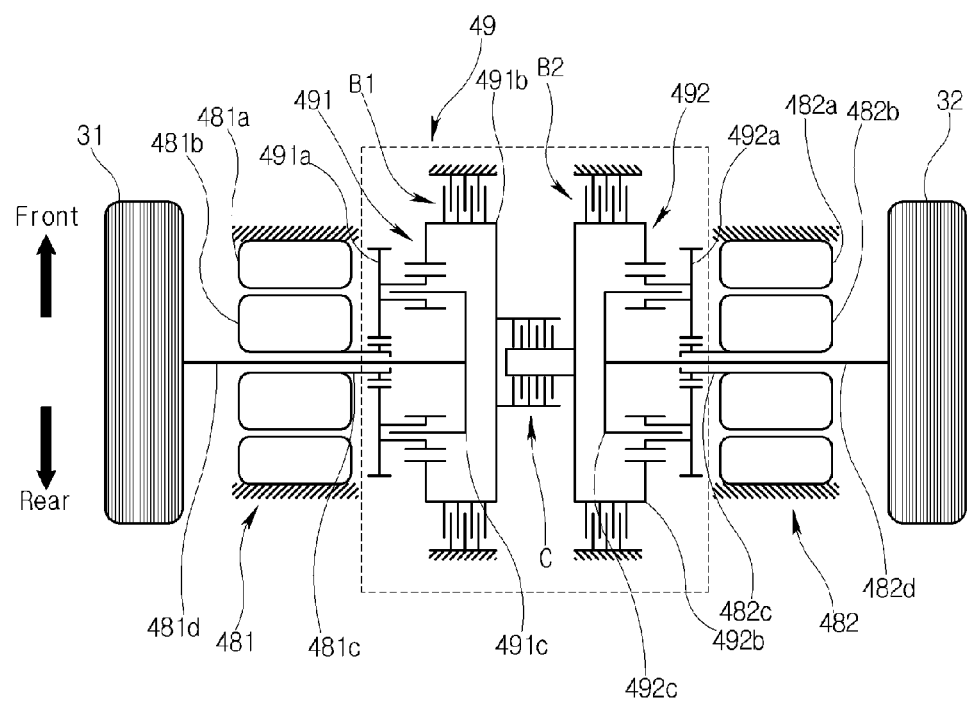
FIG. 2 is a diagram illustrating the configuration of a rear-wheel drive device and a rear-wheel reduction device in the rear-wheel drive apparatus according to the embodiment of the present invention.

FIG. 2 illustrates the configuration of the rear-wheel drive device 48 and the rear-wheel reduction device 49 in the rear-wheel drive apparatus 40 according to the embodiment of the present invention.

As described above, the rear-wheel drive device 48 includes the first motor 481 for driving the first rear wheel 31 and the second motor 482 for driving the second rear wheel 32. The first motor 481 has a first stator 481*a* which is fixed to the vehicle body and the second motor 482 has a second stator 482*a* which is fixed to the vehicle body. The first motor 481 has a first rotor 481*b*, and a first rotor shaft 481*c* corresponding to the output shaft of the first rotor 481*b* of the first motor 481 is connected to a first carrier 491*a* of a first planetary gear set 491 which will be described later.

The second motor 482 has a second rotor 482b, and a second rotor shaft 482c corresponding to the output shaft of the second rotor 482b of the second motor 482 is connected to a second carrier 492a of a second planetary gear set 492 which will be described later.

The electric motors known in the related art are applicable as the first and second motors 481 and 482 regardless of sorts and types as long as they may provide driving force required for the first and second rear wheels 31 and 32.

However, the first and second motors 481 and 482 according to the embodiment of the present invention are controlled by the motor control unit 42 so as to be driven individually and independently.

Although not limited to the drawings, the first rear wheel 31 and the first motor 481 are arranged to the front left of the vehicle and the second rear wheel 32 and the second motor 482 are arranged to the front right of the vehicle in the drawings.

As illustrated in FIG. 2, the rear-wheel reduction device 49 includes the first planetary gear set 491 which is disposed between the first rotor shaft 481c corresponding to the output shaft of the first motor 481 and the first rear wheel 31, and the second planetary gear set 492 which is disposed between the second rotor shaft 482c corresponding to the output shaft of the second motor 482 and the second rear wheel 32.

In more detail, the first planetary gear set 491 includes a first carrier 491a which is connected to the output shaft of the first motor 481, a first sun gear 491c which is connected to a first wheel shaft 481d for the first rear wheel 31, and a first ring gear 491b which is detachably fixed to the body of the vehicle. The second planetary gear set 492 includes a second carrier 492a which is connected to the output shaft of the second motor 482, a second sun gear 492c which is connected to a second wheel shaft 482d for the second rear wheel 32, and a second ring gear 492b which is detachably fixed to the body of the vehicle.

In this case, the first ring gear 491b is detachably fixed to the vehicle body by the first brake B1 which is hydraulically operated, and the second ring gear 492b is detachably fixed to the vehicle body by the second brake B2 which is hydraulically operated.

In addition, the first and second ring gears 491b and 492b are detachably interconnected by the clutch C which is hydraulically operated.

Through such a configuration, when the first and second motors 481 and 482 are driven or regenerated, the first and second brakes B1 and B2 are in a lock-on state and the clutch C is in a lock-off state. Thus, the first and second motors 481 and 482 are independently decelerated so that the first and second rear wheels 31 and 32 may be driven or energy may be recovered through the first and second rear wheels 31 and 32.

In more detail, when the first and second motors 481 and 482 are driven, the driving force of the first motor 481 and the driving force of the second motor 482 are respectively transferred to the first and second carriers 491a and 492a in the state in which the first and second rotor shafts 481c and 482c corresponding to the respective output shafts of the first and second motors 481 and 482 are connected to the first and second carriers 491a and 492a.

In this case, the first and second ring gears 491b and 492b are fixed to the vehicle body since the first and second brakes B1 and B2 are in the lock-on state, and the driving forces of the first and second carriers 491a and 492a are respectively reduced and transferred to the first and second sun gears 491c and 492c.

Next, as illustrated in the drawings, since the first and second rear wheels 31 and 32 are directly connected to the first and second sun gears 491c and 492c, respectively, the reduced driving forces of the respective motors are directly transferred to the first and second rear wheels 31 and 32 via the first and second sun gears 491c and 492c.

In this case, the first ring gear 491b is disconnected from the second ring gear 492b since the clutch is in the lock-off state, and the first and second motors 481 and 482 may be controlled by the motor control unit 42 so as to independently generate driving force or recover energy.

Although the multi-disk type first and second brakes B1 and B2 and the clutch C which are hydraulically operated are illustrated in the drawings, the present invention is not limited thereto. Brakes and a clutch, which allow the first and second ring gears 491b and 492b to be detachably fixed to the vehicle body and be disconnected from each other, may be applied to the present invention.

Here, the multi-disk type first and second brakes B1 and B2 and the clutch C will be described for the sake of convenience.

Figure 3:
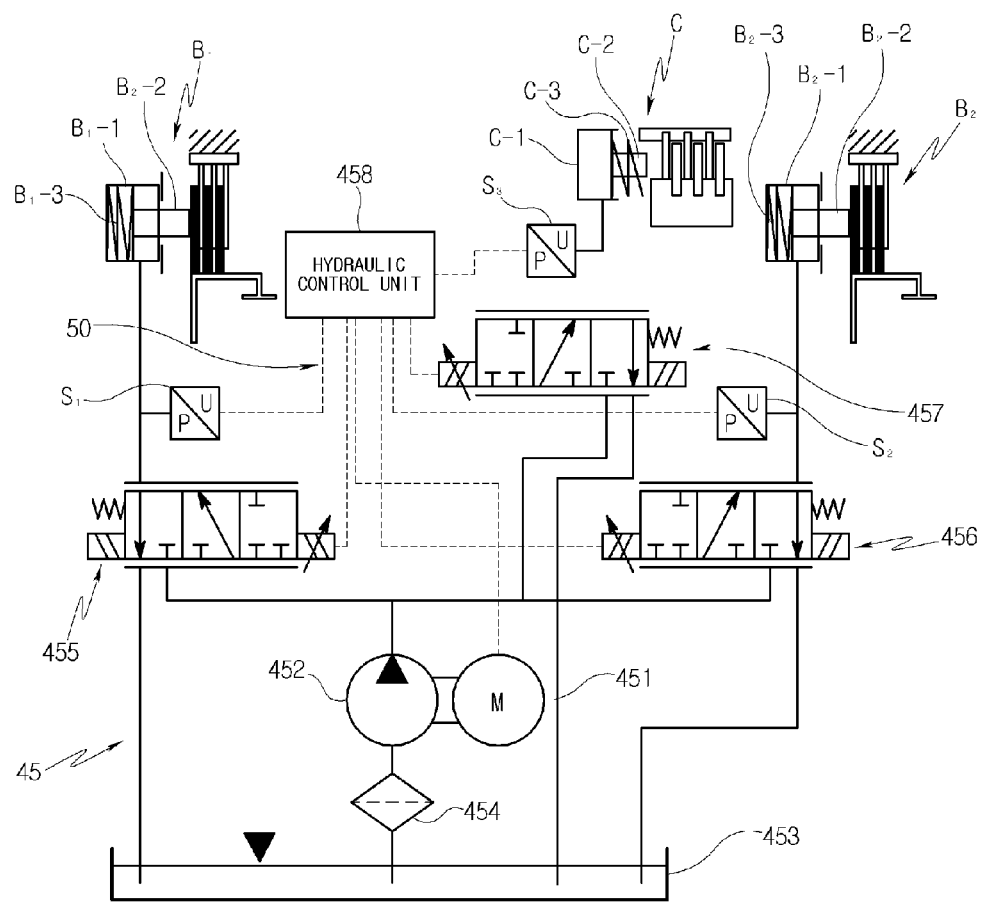
FIG. 3 is a diagram illustrating the configuration of a hydraulic control device according to the embodiment of the present invention.

FIG. 3 illustrates the hydraulic control device 45 which controls the operation of the first and second brakes B1 and B2 and the clutch C.

As illustrated in the drawing, when the first and second motors 481 and 482 are driven or regenerated, the hydraulic control device 45 according to the embodiment of the present invention supplies hydraulic pressure to the first and second brakes B1 and B2, which are in the lock-on state, and the clutch C, which is in the lock-off state, in the state in which the hydraulic pressure is not supplied thereto, so that the first and second brakes B1 and B2 are changed from the lock-on state to the lock-off state and the clutch C is changed from the lock-off state to the lock-on state.

That is, the hydraulic control device 45 according to the embodiment of the present invention changes the first and second brakes B1 and B2 from the lock-on state to the lock-off state and changes the clutch C from the lock-off state to the lock-on state, in the initial state in which the hydraulic pressure is not supplied to the first and second brakes B1 and B2 and the clutch C. Consequently, the power transfer between the rear wheels 30 and the rear-wheel drive device 48 is released and the rear-wheel reduction device 49 serves as a differential gear for the rear wheels 30.

In more detail, the hydraulic control device 45 includes a hydraulic pump 452 which presses working oil, a pump drive motor 451 which drives the hydraulic pump 452, a first hydraulic valve 455 for supplying the pressed working oil to the first brake B1, a second hydraulic valve 456 for supplying the pressed working oil to the second brake B2, a third hydraulic valve 457 for supplying the pressed working oil to the clutch C, and a hydraulic control unit 458 which controls the operation of the pump drive motor 451 and the opening and closing of the first to third hydraulic valves 455, 456, and 457.

The hydraulic pump 452 presses working oil supplied via a working oil filter 454 from a working oil reservoir 453, and the pump drive motor 451 is driven by the electric power supplied from the hydraulic control unit 458 and transfers power to the hydraulic pump 452.

Accordingly, when the vehicle control unit 41 transmits a control signal to the hydraulic control unit 458 in order to release the power transfer between the rear wheels 30 and the rear-wheel drive device 48, the hydraulic control unit 458 supplies electric power to the pump drive motor 451 and the pump drive motor 451 drives the hydraulic pump 452.

The working oil pressed by the hydraulic pump 452 is transferred to the first to third hydraulic valves 455, 456, and 457.

Since the first to third hydraulic valves 455, 456, and 457 are electrically connected to the hydraulic control unit 458, the opening and closing thereof are controlled in response to the control signal of the hydraulic control unit 458.

Meanwhile, the first to third hydraulic valves 455, 456, and 457 are respectively provided with first to third pressure sensors S1, S2, and S3 which are electrically connected to the hydraulic control unit 458.

Accordingly, when the hydraulic pressure measured by the first to third pressure sensors S1, S2, and S3 is determined to be lower than a target pressure, the vehicle control unit 41 transmits a control signal for adjusting the opening degrees of the first to third hydraulic valves 455, 456, and 457 or adjusting the pressure of the hydraulic pump 452 to the hydraulic control unit 458 so as to adjust the hydraulic pressure transferred to the first and second brakes B1 and B2 and the clutch C.

When the target hydraulic pressure is supplied through the first and second hydraulic valves 455 and 456, force is applied to brake pistons B1-2 and B2-2 which press pressure plates by brake springs B1-3 and B2-3 inside brake cylinders B1-1 and B2-1 in the direction in which the brake pistons B1-2 and B2-2 are separated from the pressure plates, with the consequence that the first and second brakes B1 and B2 are changed from the lock-on state to the lock-off state. When the target hydraulic pressure is supplied through the third hydraulic valve 457, force is applied to clutch pistons C1-2 and C2-2, which are pressed in the direction in which they are separated from the pressure plates by clutch springs C1-3 and C2-3 outside clutch cylinders C1-1 and C2-1, so that the clutch pistons C1-2 and C2-2 are moved toward the pressure plates, with the consequence that the clutch C is changed from the lock-off state to the lock-on state.

Hereinafter, the operation of the rear-wheel drive apparatus 40 according to the embodiment of the present invention will be described with reference to FIG. 4.

As described above, when the vehicle is driven only by the power of the front-wheel drive device 21, namely when the vehicle travels at high speed, the vehicle control unit 41 changes the first and second brakes B1 and B2 from the lock-on state to the lock-off state and changes the clutch C from the lock-off state to the lock-on state through the hydraulic control device 45, in order to prevent the first and second motors 481 and 482 from being damaged due to high rotation which is inversely input thereto through the reducer from the rear wheels 30.

In addition, when electric power is supplied to at least one of the first and second motors 481 and 482 for the rapid direction change or lane change of the vehicle when the vehicle travels at low speed or high speed, the vehicle control unit 41 allows the first and second brakes B1 and B2 to be maintained in the lock-on state and allows the clutch C to be maintained in the lock-off state such that hydraulic pressure is not supplied to the first and second brakes B1 and B2 and the clutch C through the hydraulic control device 45.

Figure 4:
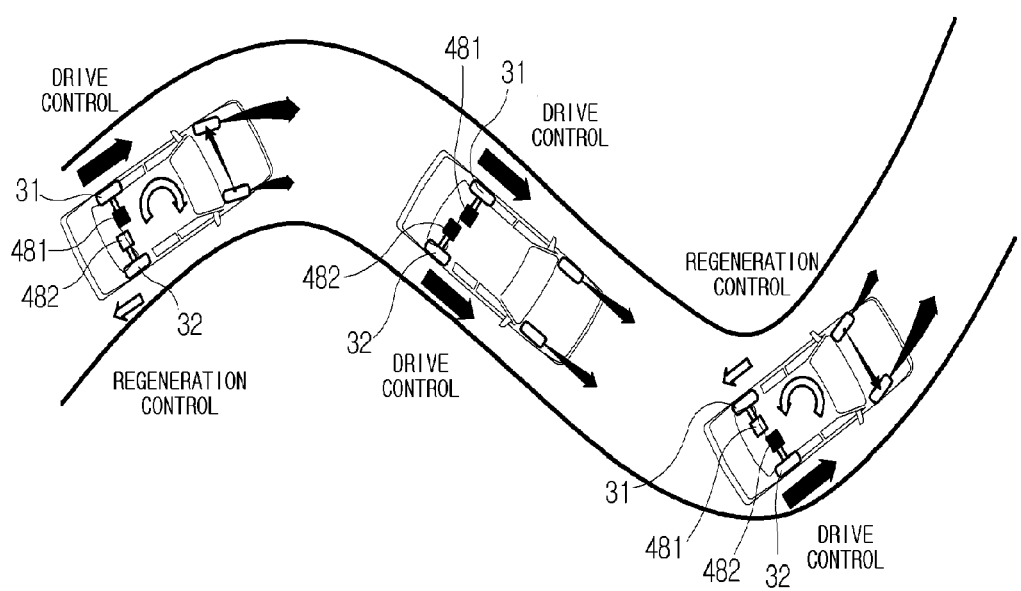
FIG. 4 is a view for explaining the operation of the rear-wheel drive apparatus according to the embodiment of the present invention.

FIG. 4 illustrates the operation of the rear-wheel drive device 48 when the vehicle changes directions.

As illustrated to the left of FIG. 4, when a driver's intention of rapidly changing the progress of the vehicle in the right direction is input to the vehicle control unit 41 when the vehicle travels at high speed, the vehicle control unit 41 calculates a required rotational moment, based on the above information.

The vehicle control unit 41 transmits a control signal for driving the first rear wheel 31 according to the calculated moment to the motor control unit 42, and the motor control unit 42 supplies required electric power to the first motor 481 so as to drive the first rear wheel 31 using the first motor 481.

In this case, the vehicle control unit 41 controls the second motor 482 such that electric power is not supplied to the second motor 482, and performs regeneration control that recovers energy from the second rear wheel 32 using the second motor 482.

Thus, compared to conventional techniques, the direction of the vehicle can be easily and rapidly changed to the right direction by controlling the driving of the first rear wheel 31 using the first motor 481, thereby significantly improving the handling performance of the vehicle. In addition, it is possible to improve the efficiency and fuel efficiency of the vehicle by recovering energy from the second rear wheel 32.

As illustrated to the right of FIG. 4, when a driver's intention of rapidly changing the progress of the vehicle in the left direction is input to the vehicle control unit 41 when the vehicle travels at high speed, the vehicle control unit 41 controls the driving of the second rear wheel 32 using the second motor 482 and recovers energy from the first rear wheel 31, unlike the above case.

Similar to the control of the convention four-wheel-drive eco-friendly vehicle, when there is a need to instantaneously increase the power of the eco-friendly vehicle 100 according to the embodiment of the present invention such as when the vehicle is rapidly started on the slope road or is rapidly accelerated during traveling, the front-wheel drive apparatus 20 or the rear-wheel drive apparatus 40, which is not driven, may be instantaneously driven. Therefore, it is possible to improve the power of the vehicle by supplementing insufficient driving force thereto and to improve the traveling stability of the vehicle.

The intermediate portion of FIG. 4 illustrates that when the vehicle is driven only by the front wheels 10, a driver's intention of rapidly accelerating the vehicle is input to the vehicle control unit 41 and the vehicle control unit 41 drives the rear-wheel drive apparatus 40, which is not driven, so as to instantaneously increase the power of the vehicle by driving both of first and second rear wheels 31 and 32. Therefore, it is possible to supplement insufficient driving force to the vehicle by instantaneously driving the rear-wheel drive apparatus 40.

As is apparent from the above description, a rear-wheel drive apparatus of an eco-friendly vehicle according to the present invention has an effect that can improve the longitudinal driving force of a vehicle and the handling performance of the vehicle, such as the rapid change of direction of the vehicle, using a plurality of drive motors for independently driving both rear wheels.

Various embodiments have been described in the best mode for carrying out the invention. It will be understood that the above-mentioned technical configurations of the exemplary embodiments may be executed in order to enable those of ordinary skill in the art to embody and practice the invention in other specific forms without changing the spirit or essential features of the invention.

Although the present invention has been described with respect to the illustrative embodiments, it will be apparent to those skilled in the art that various variations and modifications may be made without departing from the spirit and scope of the invention as defined in the following claims.

What is claimed is:

1. A rear-wheel drive apparatus of an eco-friendly vehicle for independently driving first and second rear wheels of a vehicle, comprising:
   a rear-wheel drive device comprising a first motor for driving the first rear wheel and a second motor for driving the second rear wheel;
   a rear-wheel reduction device reducing driving forces of the first and second motors to respectively transfer the driving forces to the first and second rear wheels, and comprising a first planetary gear set disposed between an output shaft of the first motor and the first rear wheel and a second planetary gear set disposed between an output shaft of the second motor and the second rear wheel; and
   a controller for controlling the rear-wheel drive device and the rear-wheel reduction device so as to independently drive the first and second motors,
   wherein the first planetary gear set comprises a first sun gear connected to the output shaft of the first motor, a first carrier connected to the first rear wheel, and a first ring gear detachably fixed to a vehicle body, and the second planetary gear set comprises a second sun gear connected to the output shaft of the second motor, a second carrier connected to the second rear wheel, and a second ring gear detachably fixed to the vehicle body, and
   wherein the rear-wheel reduction device further comprises a first brake for detachably fixing the first ring gear to the vehicle body while being hydraulically operated, and a second brake for detachably fixing the second ring gear to the vehicle body while being hydraulically operated, and when a hydraulic pressure is not supplied to the first and second brakes, the first and second ring gears are fixed by the first and second brakes, and
   wherein the rear-wheel reduction device further comprises a clutch for detachably interconnecting the first and second ring gears while being hydraulically operated, and when a hydraulic pressure is not supplied to the clutch, the clutch is in a clutch-off state so that the first and second ring gears are disconnected from each other, and
   wherein the controller comprises:
   a motor control unit operated to independently supply driving power to the first and second motors;
   a hydraulic control device operated to generate a hydraulic pressure and supply the hydraulic pressure to the first and second brakes and the clutch; and
   a vehicle control unit electrically connected to the motor control unit and the hydraulic control device so as to control operation of the motor control unit and the hydraulic control device, and
   wherein when electric power supplied to the first and second motors is interrupted by the motor control unit, the vehicle control unit changes the first and second brakes from a brake-on state to a brake-off state and changes the clutch from the clutch-off state to a clutch-on state through the hydraulic control device.

2. The rear-wheel drive apparatus according to claim 1, wherein when electric power is supplied to at least one of the first and second motors by the motor control unit, the vehicle control unit controls the first and second brakes and the clutch such that the hydraulic pressure is not supplied thereto through the hydraulic control device.

3. The rear-wheel drive apparatus according to claim 2, further comprising a battery for storing electric power supplied to the first and second motors,
   wherein when electric power is supplied to at least one of the first and second motors, the motor control unit recovers electric power generated by the other motor, which is not supplied with electric power, so as to allow the generated electric power to be stored in the battery.

* * * * *